United States Patent [19]
Erez et al.

[11] Patent Number: 5,480,742
[45] Date of Patent: Jan. 2, 1996

[54] ELECTROCHEMICAL CELL INCLUDING COMPRESSED, UNBONDED, ELECTRODE GRANULES AND LIQUID ELECTROLYTE

[76] Inventors: Mordechai Erez, 19 Sharsheret Street, 69697 Tel-Aviv; Israel Reshef, 38 Hameri Street, 53330 Givataim, both of Israel

[21] Appl. No.: 240,001

[22] Filed: May 9, 1994

[30] Foreign Application Priority Data

May 13, 1993 [IL] Israel ........................................ 105688

[51] Int. Cl.$^6$ .................................................... H01M 2/38
[52] U.S. Cl. .................. 429/66; 429/70; 429/72; 429/81
[58] Field of Search ............................ 429/66, 70, 120, 429/72, 81

[56] References Cited

U.S. PATENT DOCUMENTS

| | | | |
|---|---|---|---|
| 759,007 | 5/1903 | Niblett | 429/66 |
| 1,379,088 | 5/1921 | Edison | 429/66 |
| 4,042,754 | 8/1977 | Borello | 429/70 |
| 4,237,197 | 12/1980 | Hart | 429/70 |
| 4,389,466 | 6/1983 | Joy | 429/66 |
| 4,477,540 | 10/1984 | Miller et al. | 429/66 |

Primary Examiner—Prince Willis, Jr.
Assistant Examiner—Carol Chaney
Attorney, Agent, or Firm—Ladas & Parry

[57] ABSTRACT

An electrochemical cell including a housing containing a cathode electrode, an anode electrode, electrode terminals, and a liquid electrolyte; characterized in that the electrodes are in the form of unbonded granules located in separate compartments within the housing and separated by a separator; the granules filling their respective compartments and being subjected to a compressive force to produce good electrical contact between their outer surfaces; the electrolyte filling the interstitial spaces between the granules.

20 Claims, 2 Drawing Sheets

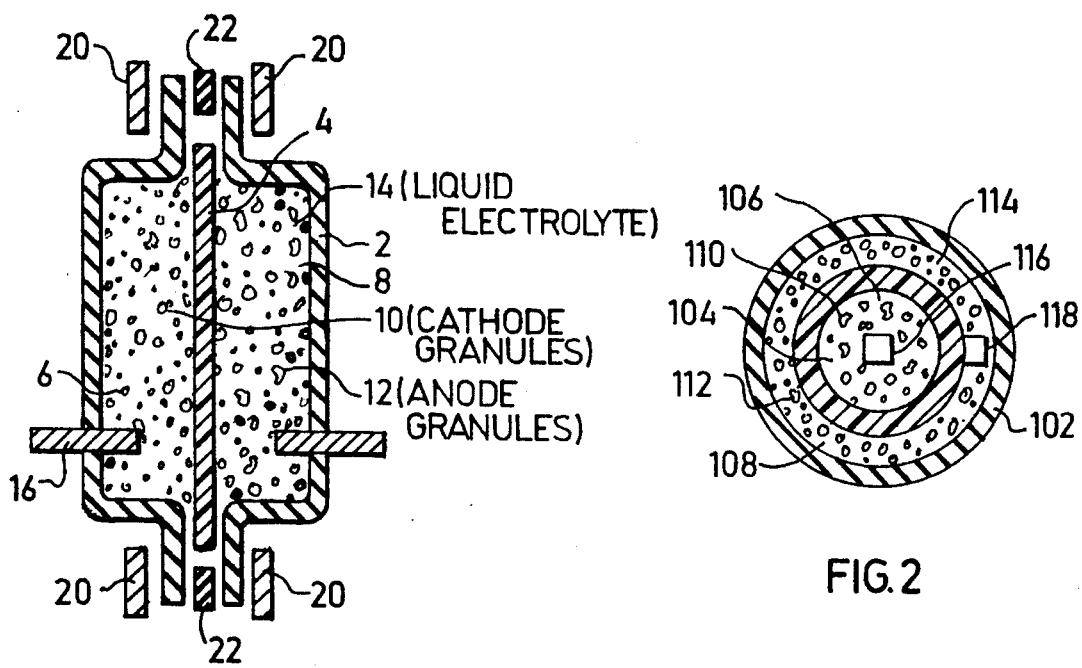
FIG. 1
FIG. 2
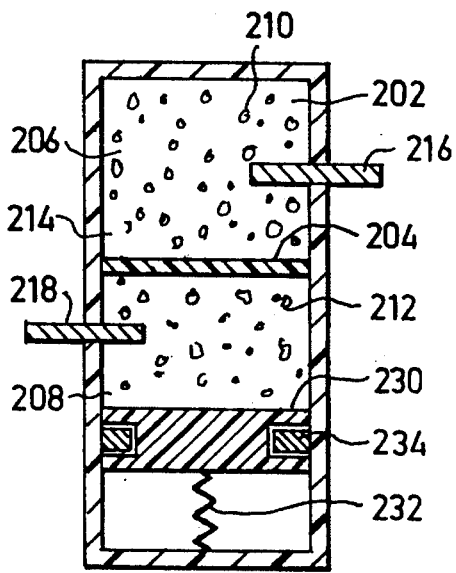
FIG. 3
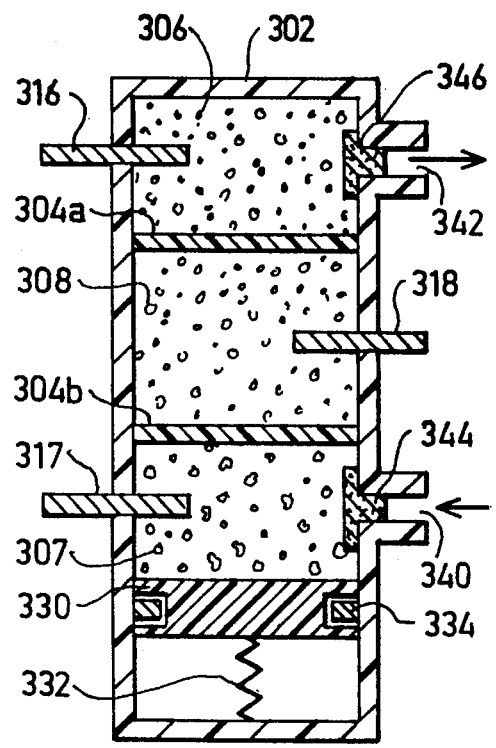
FIG. 4

ELECTROCHEMICAL CELL INCLUDING COMPRESSED, UNBONDED, ELECTRODE GRANULES AND LIQUID ELECTROLYTE

FIELD AND BACKGROUND OF THE INVENTION

The present invention relates to an electrochemical cell, and particularly to one having a capability of providing high energy levels and power densities as compared to the electrochemical cells in common use today.

Electrochemical cells include a housing divided into separate compartments, a cathode electrode in one compartment, an anode electrode in another compartment, and a liquid electrolyte in contact with the two electrodes. In the conventional electrochemical cell, the two electrodes are of a solid, rigid construction. Such electrodes are therefore heavy, brittle and easily damaged. Moreover, their energy levels and power densities are limited by the limited contact of the surfaces of the electrodes with the liquid electrolyte, and also by the limited heat-dissipation characteristics of such a construction.

OBJECTS AND BRIEF SUMMARY OF THE INVENTION

An object of the present invention is to provide a new electrochemical cell construction having advantages in the above respects.

According to the present invention, there is provided an electrochemical cell including a housing containing a cathode electrode, an anode electrode, electrode terminals, and a liquid electrolyte characterized in that each of the electrodes is in the form of granules which are unbonded to each other so as to be freely flowing when in an unconfined state. The unbonded granules are located in separate compartments within the housing separated from each other by a separator. The granules fill their respective compartments and are subjected to a compressive force pressing them against each other. Each of the compartments is of a depth many times the largest dimension of the unbonded granules such that the compressive force presses the unbonded granules against each other from all sides to enhance electrical contact between their outer surfaces. The liquid electrolyte fills the interstitial spaces between the granules.

Several embodiments of the invention are described below for purposes of example.

In one described embodiment, the housing is of a resilient material which, by its inherent resiliency, subjects the electrode granules to the compressive force.

In other described embodiments, the housing includes a displaceable member which subjects the electrode granules to the compressive force. Preferably, the displaceable member is a displaceable piston, although it is contemplated that other displaceable members, such as diaphragms, could also be used for this purpose.

According to further features in the preferred embodiments of the invention described below, the housing includes an inlet port for inletting liquid electrolyte into the housing, and an outlet port for outletting liquid electrolyte from the housing. The cell further includes an external fluid-circulating system connected to the inlet and outlet ports for force-circulating liquid electrolyte through the electrode compartments. Such an external system preferably also includes a heat-exchanger for dissipating the heat absorbed by the liquid electrolyte. It may also include a sensor for sensing the concentration of the electrolyte in the electrochemical cell, and for maintaining it at a desired level.

The foregoing features enable electrochemical cells to be constructed providing greater electrode surface area per weight than conventional cells, and therefore higher power, charge and energy densities. In addition, the granular structure of the electrodes enables the electrolyte to be pumped through the interstitial spaces between the electrode granules such that the electrical current generated by the cell is not diffusion limited. In addition, such a cell is characterized by lower ohmic resistance and therefore generates less heat; moreover, the heat is better dissipated particularly when using an external fluid-circulating system for force-circulating the electrolyte through the cell. In addition, since more surface area of the electrodes is subjected to the liquid electrolyte, a damaged part of the electrode has a smaller effect on the performance of the cell. Such a cell is also more resistant to mechanical damage and shock, and can be easily shaped to any desired form according to the available space in any particular application of the cell.

Yet another advantage is that the granular structure of the electrodes permits the efficient use of supercritical fluids in the liquid electrolyte, e.g., in the displaceable-piston application of the invention. Supercritical fluids retain low viscosity at low temperatures, and can penetrate easily the interstitial spaces of the electrode granules. This enables operation of the cell at very low temperatures, and also provides for fast activation and deactivation of the cell.

An electrochemical cell constructed in accordance with the foregoing features is to be distinguished from electrochemical cells including sintered or spongy electrodes. In such electrochemical cells, the spaces between the sintered electrode granules are small, and therefore are not easily penetrated by the electrolytic solution such that substantially only the outer surfaces of the electrodes take part in the electrochemical process especially at high current densities. In addition, such electrodes are brittle and prone to material loss through mechanical stresses and abrasion occurring during the operation of the cell.

Further features and advantages of the invention will be apparent from the description below.

BRIEF DESCRIPTION OF THE DRAWINGS

The invention is herein described, by way of example only, with reference to the accompanying drawings.

FIG. 1 is a longitudinal sectional view illustrating one electrochemical cell construction in accordance with the present invention;

FIG. 2 is a transverse sectional view illustrating another electrochemical cell construction in accordance with the present invention; and FIGS. 3, 4 and 5 are longitudinal sectional views illustrating three further electrochemical cell constructions in accordance with the present invention.

DESCRIPTION OF PREFERRED EMBODIMENTS

Figure 5:
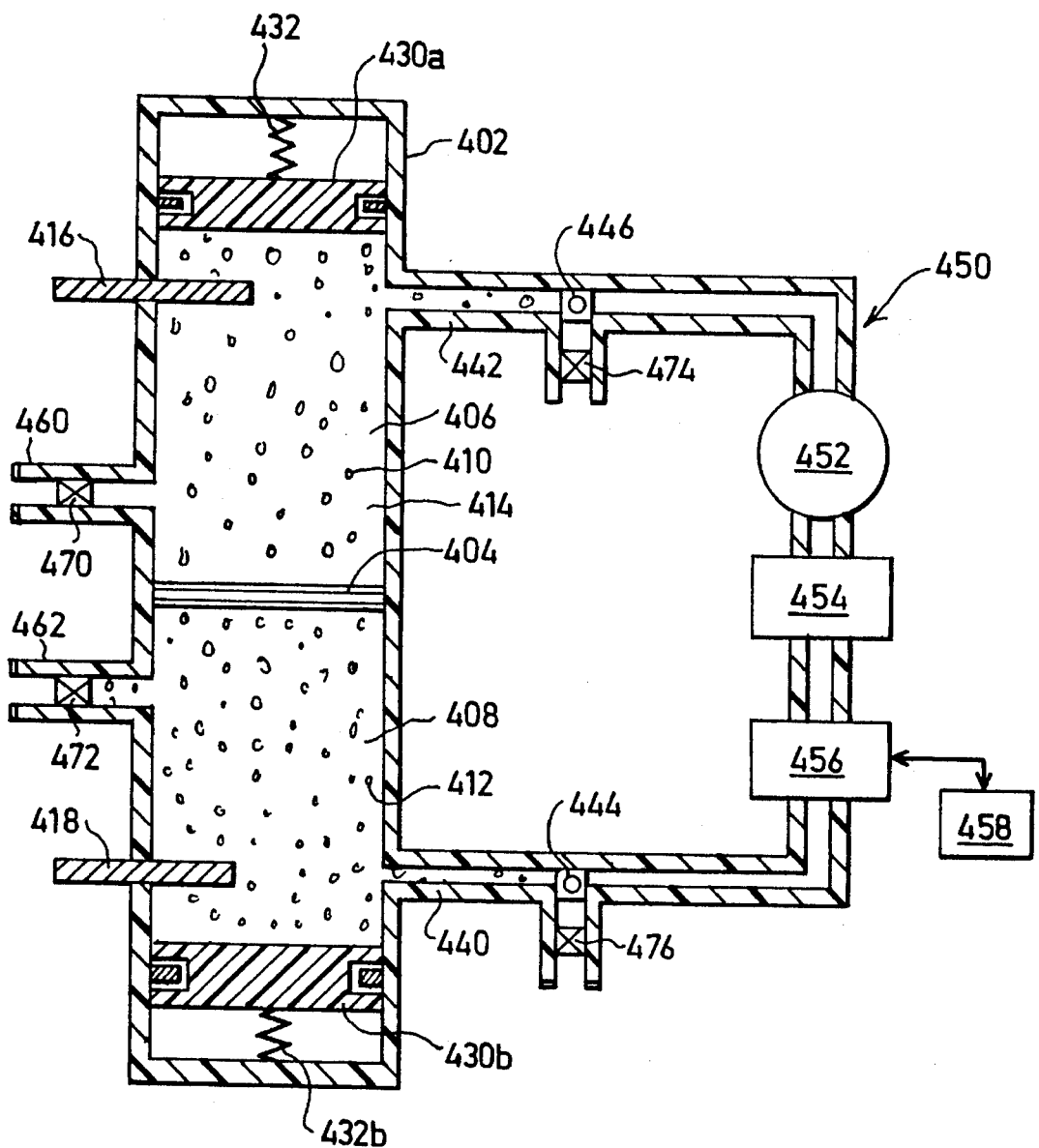

The electrochemical cell illustrated in FIG. 1 comprises a housing, generally designated 2, including a separator 4 dividing the interior of the housing into two compartments 6 and 8. Compartment 6 is filled with granules of a cathode electrode 10, and compartment 8 is filled with granules of an anode electrode 12. Both compartments are filled with a liquid electrolyte 14. Compartment 6 further includes a cathode terminal 16 projecting through the wall of housing 2 and in contact with the cathode granules 10. Compartment 8 similarly includes an anode terminal 18 projecting through the housing wall and in contact with the anode granules 12. Separator 4 is of a porous material permitting the electrolyte 14 to pass therethrough.

The cathode granules 10 and the anode granules 12 are not sintered together or otherwise bonded to each other, but rather are free-flowing when in an unconfined state. However, each granule may be constituted of a plurality of sintered particles to provide a large surface area. Preferably, the sizes of the granules are from 0.1 to 10 mm. They may take various configurations, but are preferably spherical with roughened outer surfaces.

In the electrochemical cell illustrated in FIG. 1, the granules are subjected to a compressive force by the inherent resiliency of the housing 2 to produce good electrical contact between their outer surfaces. Thus, the housing may be made of natural or synthetic rubber sections clamped together by clamps 20 applied around the periphery of the housing and sealed by sealing strips 22. The liquid electrolyte 14 and electrode granules 10, 12 are introduced into the housing such that the inherent resiliency of the housing causes the electrode granules to completely fill the respective compartments 6, 8, causes the housing to apply a compressive force against the electrolyte and granules to produce good electrical contact between the outer surfaces of the granules and also between them and their respective terminals 16, 18, and causes the interstitial spaces between the granules to be completely filled with the liquid electrolyte.

Following is one example of the materials that may be used for producing a lead-sulphur acid battery: The cathode granules 10 may be of lead having a granule size of 0.1–2.0 mm, preferably about 1.0 mm; the anode granules 12 may be of lead dioxide having a granule size of 0.1–2.0 mm, preferably 1.0 mm; the liquid electrolyte may be an aqueous solution of sulphuric acid of a concentration of 5–30%, preferably about 10%; and the separator 4 may be of porous paper, rubber, glass, polyvinylchloride, polyester, polypropylene, etc. One particular example of a separator is a glass mat having a pore size of 1–20 μm, preferably about 10 μm.

FIG. 2 illustrates a variation in the construction of the electrochemical cell. In this variation, the two compartments defined by the separator are located coaxially with respect to each other, rather than in a side-by-side relation as in FIG. 1. The cell illustrated in FIG. 2 is otherwise constructed in the same manner as described above with respect to FIG. 1; and to facilitate understanding its construction, the same reference numerals have been used for identifying the corresponding parts as in FIG. 1, but increased by 100. Thus, the outer housing in the cell of FIG. 2 is indicated at 102, the separator at 104, the two compartments at 106 and 108, the cathode granules and anode granules at 110 and 112, respectively, the liquid electrolyte at 114, and the terminals at 116 and 118, respectively.

FIG. 3 illustrates an electrochemical cell constructed in accordance with the invention but including a displaceable member for subjecting the electrode granules to compression to produce good electrical contact between the outer surfaces, and also between the outer surfaces and the terminals. Thus, the electrochemical cell illustrated in FIG. 3 also includes a housing 202, divided by a separator 204 into the two compartments 206 and 208, one compartment being filled with cathode granules 210, and the other compartment being filled with anode granules 212, and both compartments being filled with the liquid electrolyte 214. The cell illustrated in FIG. 3 further includes the two terminals 216 and 218 in contact with their respective electrode granules 210 and 212.

However, in the cell illustrated in FIG. 3, the housing 202 is of rigid material but includes a displaceable member 230, in the form of a piston, for applying a compressive force to the electrode granules in order to produce good electrical contact between their outer surfaces and the terminals 216, 218. Piston 230 is displaceable within housing 202 by means of a spring 232 interposed between the piston and the end wall of the housing, and is sealed with respect to the inner surface of the housing by a sealing ring 234.

The electrochemical cell illustrated in FIG. 3 may be otherwise constructed with the same materials as described above with respect to FIG. 1. However, in the construction illustrated in FIG. 3, the separator 204 would also preferably be displaceable so that the compressive force would be applied uniformly to the two compartments 206 and 208 upon the displacement of the piston 230.

An advantage of the FIG. 3 construction as indicated earlier is that such an electrochemical cell could also use a supercritical electrolyte having a low viscosity at low temperatures, to enable operation of the battery at very low temperatures. Examples of supercritical electrolytes that may be used are carbon dioxide and ammonia, both with traces of water.

FIG. 4 illustrates a further construction, similar to that of FIG. 3, except that the housing 302 of the electrochemical cell is provided with two separators 304a, 304b, thereby dividing the interior of the cell into three compartments 306, 307 and 308, respectively. Thus, the two outside compartment 306 and 307 could serve as the cathode compartments, and their terminals 316 and 317 could be connected together; whereas the middle compartment 308 could serve as the anode compartment straddled on opposite sides by the two cathode compartments and including its anode terminal 318.

The electrochemical cell illustrated in FIG. 4 also includes a piston 330 urged by a spring 332 and sealed by a seal 334 to apply a compressive force to the electrode granules 310, 311 and 312, respectively, located within the three compartments 306, 307 and 308. The two separators 304a, 304b in the cell of FIG. 4 would also be displaceable in order to uniformly transmit the compressive force applied by piston 330 to the electrode granules in all three compartments.

The electrochemical cell illustrated in FIG. 4 further includes an inlet port 340 leading into outer compartment 307, and an outlet port 342 leading out from compartment 306 at the opposite end of the cell. Ports 340 and 342 are to be connected to an external fluid-circulating system for circulating the liquid electrolyte 314 through the cell. Each of the ports 340, 342 includes a strainer element 344, 346, respectively, for blocking the flow of the electrode granules out of the cell, and for permitting only the liquid electrolyte to be circulated through the cell. By thus circulating the liquid electrolyte through the cell, the electrical current through the cell is not diffusion limited; moreover, this reduces the ohmic resistance of the cell, and also better dissipates the heat generated within the cell.

FIG. 5 illustrates a further construction of electrochemical cell, similar to that of FIG. 4, but more particularly illustrating the external fluid-circulating system for circulating the liquid electrolyte through the cell. The housing 402 of the electrochemical cell illustrated in FIG. 5 is also made of rigid material, such as steel covered with an insulating layer of e.g., polypropylene or vulcanized rubber. It includes a separator 404 dividing the interior of the housing into two compartments 406 and 408, respectively, with each compartment being filled with electrode granules 410 and 412, respectively, and with a liquid electrolyte 414. Electrical connections are made to the electrodes via terminals 416 and 418.

The cell illustrated in FIG. 5 includes two displaceable pistons 430a, 430b at the opposite ends each urged by a spring 432a, 432b to apply a compression force to the electrode granules, and thereby to produce good electrical contact between their outer surfaces and also their respective terminals 416, 418. The separator 404 need not be displaceable but could be fixed within the housing.

The cell illustrated in FIG. 5 further includes an inlet port 440 at one end of the cell, and an outlet port 442 at the opposite end of the cell, for circulating the liquid electrolyte through the cell via strainer elements 444 and 446 and an external fluid-circulating system 450. The latter system includes a pump 452, a heat exchanger 454, and a concentration sensor 456 which senses the concentration of the liquid electrolyte circulated through system 450 and maintains the concentration substantially constant by adding or removing electrolyte with respect to an electrolyte supply reservoir 458.

The electrochemical cell illustrated in FIG. 5 includes two additional ports 460, 462 for adding, removing, or replacing the electrode granules and/or the liquid electrolyte. Each of ports 460, 462 as well as the previously-mentioned ports 442, 442, is provided with a shut-off valve, as shown at 470, 472, 474 and 476, respectively. By opening valves 470 and 474, compartment 406 may be emptied and refilled with electrode granules and liquid electrolyte via ports 460 and 442; and similarly, by opening valves 474 and 476, compartment 408 may be emptied and refilled with electrode granules via ports 462 and 444.

While the invention has been described with respect to several preferred embodiments, it will be appreciated that these are set forth merely for purposes of example, and that many other variations, modifications and applications of the invention may be made.

What is claimed is:

1. An electrochemical cell including a housing containing a cathode electrode, an anode electrode, electrode terminals, and a liquid electrolyte; characterized in that each of said electrodes is in the form of granules which are unbonded to each other so as to be freely flowing when in an unconfined state, said unbonded granules being located in separate compartments within said housing separated from each other by a separator; said granules filling their respective compartments and being subjected to a compressive force pressing them against each other; each of said compartments being of a depth many times the largest dimension of said unbonded granules such that said compressive force presses the unbonded granules against each other from all sides to enhance electrical contact between their outer surfaces; said electrolyte filling the interstitial spaces between said granules.

2. The cell according to claim 1, wherein said housing is of a resilient material which, by its inherent resiliency, subjects said electrode granules to said compressive force.

3. The cell according to claim 1, wherein said housing includes a displaceable member which subjects the electrode granules to said compressive force.

4. The cell according to claim 3, wherein said displaceable member is a piston.

5. The cell according to claim 3, further including a biasing spring for displacing said displaceable member.

6. The cell according to claim 3, wherein said separator is also displaceable within said housing.

7. The cell according to claim 3, wherein said separator is fixed, and said housing includes two displaceable members on opposite sides of said separator.

8. The cell according to claim 1, wherein said housing includes an inlet port for inletting liquid electrolyte into said housing, and an outlet port for outletting liquid electrolyte from said housing.

9. The cell according to claim 8, further including an external fluid-circulating system connected to said inlet and outlet ports for force-circulating liquid electrolyte through said electrode compartments.

10. The cell according to claim 9, wherein each of said ports includes a strainer for preventing the passage of said electrode granules into said external fluid-circulating system.

11. The cell according to claim 9, wherein said external fluid-circulating system includes a heat-exchanger for dissipating heat absorbed by said liquid electrolyte.

12. The cell according to claim 9, wherein said external fluid-circulating system further includes a sensor for sensing the concentration of said liquid electrolyte in said compartments, and for maintaining it at a desired level.

13. The cell according to claim 1, further including an inlet port for each compartment for refilling the compartment with fresh electrode granules and liquid electrolyte.

14. The cell according to claim 13, wherein each of said inlet ports further includes a valve for controlling the inletting of the fresh electrode granules and liquid electrolyte into the respective compartment.

15. The cell according to claim 1, wherein the electrode granules are of a size from 0.1 to 10 mm.

16. An electrochemical cell, comprising:

a housing divided by a porous separator into at least two compartments;

a cathode electrode in the form of unbonded granules filling one of said compartments;

an anode electrode in the form of unbonded granules filling the other of said compartments; and electrical terminals passing through a wall in said housing and in electrical contact with said electrode granules;

said housing further including an inlet port for inletting liquid electrolyte into said housing, and an outlet port for outletting liquid electrolyte from said housing;

said liquid electrolyte filling said compartments and the interstitial spaces between said electrode granules;

said housing applying a compressive force to said unbonded granules to enhance the electrical contact between their outer surfaces and with said terminals.

17. The cell according to claim 16, wherein said outlet port includes a strainer for preventing the passage of said unbonded granules therethrough.

18. The cell according to claim 17, further including an external fluid-circulating system connected to said inlet and outlet ports for force-circulating said liquid electrolyte through said electrode compartments.

19. The cell according to claim 16, wherein said housing is of a resilient material which, by its inherent resiliency, subjects said electrode granules to said compressive force.

20. The cell according to claim 15, wherein said housing includes a displaceable member which subjects said electrode granules to said compressive force.

* * * * *